(12) United States Patent
Lin

(10) Patent No.: US 6,903,842 B2
(45) Date of Patent: Jun. 7, 2005

(54) METHOD FOR GENERATING FULL-PAGE PRINT DATA

(75) Inventor: Fu-Chang Lin, Taipei (TW)

(73) Assignee: Destiny Technology Corporation, Taipei (TW)

(*) Notice: Subject to any disclaimer, the term of this patent is extended or adjusted under 35 U.S.C. 154(b) by 162 days.

(21) Appl. No.: 10/065,784

(22) Filed: Nov. 18, 2002

(65) Prior Publication Data

US 2004/0095603 A1 May 20, 2004

(51) Int. Cl.[7] .............................................. G06F 15/00

(52) U.S. Cl. ..................... 358/1.18; 358/296; 358/474; 358/522

(58) Field of Search ................................. 358/1.18, 296, 358/522, 474; 271/3.02; 399/410, 407–408; 382/312, 321; 270/18

(56) References Cited

U.S. PATENT DOCUMENTS 6,522,791 B2 * 2/2003 Nagarajan .................... 382/321

* cited by examiner

Primary Examiner—Twyler M. Lamb
(74) Attorney, Agent, or Firm—Winston Hsu

(57) ABSTRACT

A method for converting a document into a full-page image using a graphical device interface (GDI) of an operating system is disclosed. The GDI provides objects of the document and coordinates of the objects in the document. The document is divided into a plurality of blocks. An address array having a plurality of address units is established to record the coordinates of the objects. Each of the address units corresponds to one of the blocks and is used to record positions of the objects in the block. The positions recorded in the address units are updated according to the coordinates of the objects provided by the GDI. A corresponding image piece for each block is generated according to the updated positions recorded in the corresponding address unit. All of the image pieces are merged into the full-page image.

8 Claims, 7 Drawing Sheets

METHOD FOR GENERATING FULL-PAGE PRINT DATA

BACKGROUND OF INVENTION

1. Field of the Invention

The present invention relates to a method for generating full-page print data, and more particularly to a method for generating full-page print data to a laser printer.

2. Description of the Prior Art

As laser printer technologies improve, printers can create higher image resolution pages, and the amount of raster data needed to be transmitted to a printer to print an image also increases, adversely affecting printer performance. When an image is scaled and dithered before it is sent to a printer, an 8 by 10 inch raster image requires 0.9 Mbytes of data for a 300 DPI device, 3.6 Mbytes for a 600 DPI device, and 14.4 Mbytes of data for a 1200 DPI device.

The prior art method for generating print data to a laser printer is inefficient. For example, during the procedure of generating the print data, because all objects of the document are compared with each other by performing raster operations (ROPs), it is time-consuming to combine these objects if a document has many.

Furthermore, because of the characteristics of laser printers, a corresponding full-page image must be prepared before any one page is printed so that a a large memory capacity is needed to temporarily store processing data during the generation of the full-page image.

SUMMARY OF INVENTION

It is therefore a primary objective of the present invention to provide a method for using less memory to temporarily store processing data and for efficiently generating full-page print data to a printer by identifying locations of all objects.

According to the claimed invention, a graphical device interface (GDI) of an operating system and a printer driver are used to convert a document into a full-page image. The GDI provides objects of the document and coordinates of the objects in the document. The document is divided into a plurality of blocks. An address array having a plurality of address units is established to record the coordinates of the objects. Each of the address units corresponds to one of the blocks and is used to record positions of the objects in the block. The positions recorded in the address units are updated according to the coordinates of the objects provided by the GDI. A corresponding image piece for each block is generated according to the updated positions recorded in the corresponding address unit. Finally all of the image pieces are merged into the full-page image.

It is an advantage of the present invention that each of the image pieces is generated without referencing other objects located within other blocks of the document so that the combination of the objects is efficient.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
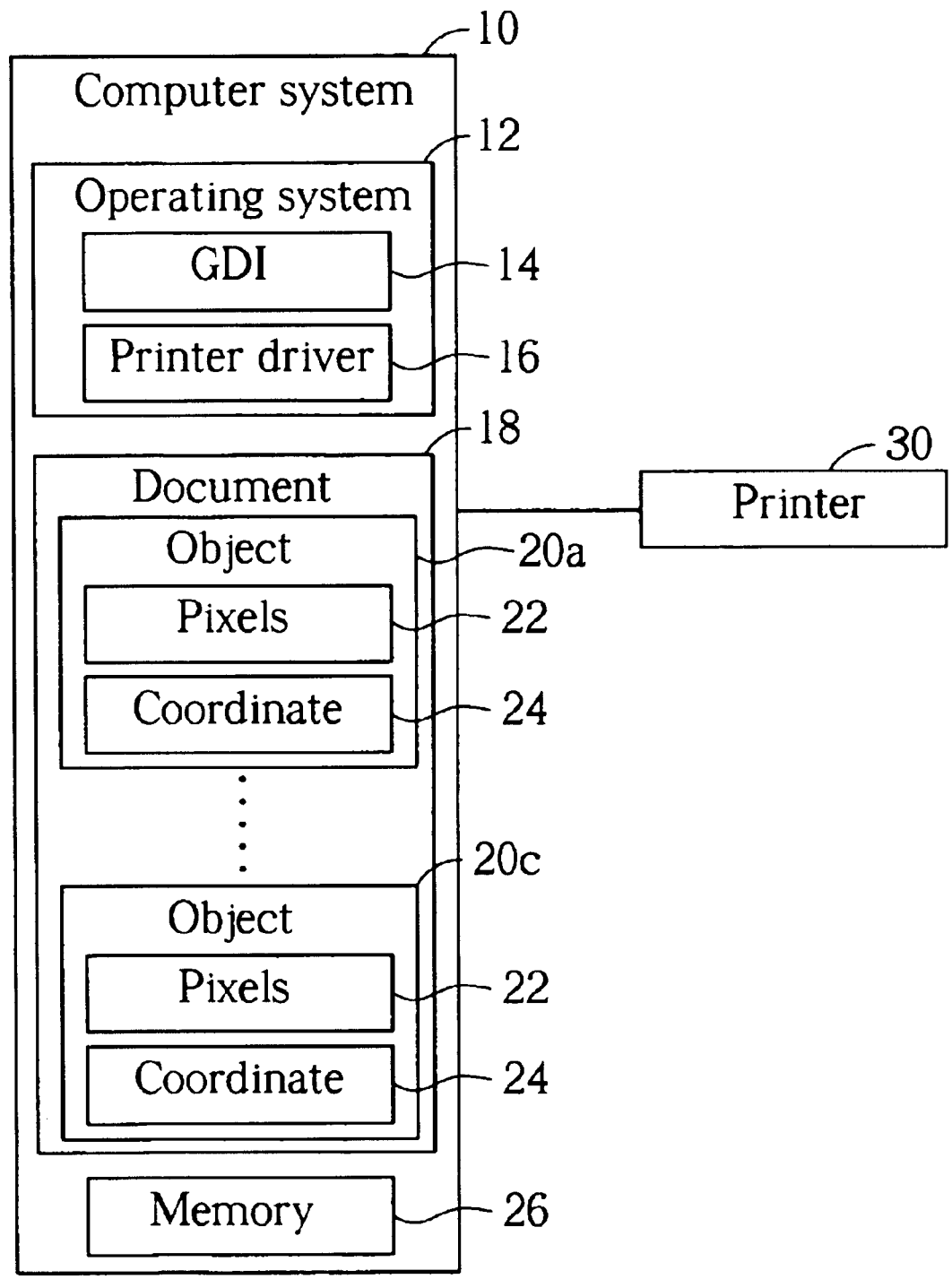
FIG. 1 is a functional block diagram of a computer system connected to a printer adapting the method of the present invention.

Please refer to FIG. 1, which is a functional block diagram of a computer system 10 connected to a printer 30 adapting the method of the present invention. The computer system 10 comprises an operating system (OS) 12, such as the Windows 95 operating system published by Microsoft Corp., and a memory 26 for storing data. The OS 12 is used to control operations of the computer system 10 and comprises a graphical device interface (GDI) 14 for managing graphical processes of the computer system 10 and a printer driver 16 for controlling operations of the printer 30 according to the method of the present invention. The GDI 14 is a standard graphical interface for the Microsoft Windows operating systems, and each time the computer system 10 controls the printer 30 to print a document, such as a document 18 stored in the computer system 10, the GDI 14 and the printer driver 16 must be used to convert the document 18 into a full-page image for the printer 30 to print. The printer 30 is a laser printer so that the print data of the full-page image should be prepared before a corresponding page of document 18 is printed. In other words, the printer 30 does not print the document 18 until it receives all of the print data of the full-page image converted from the document 18.

Figure 2:
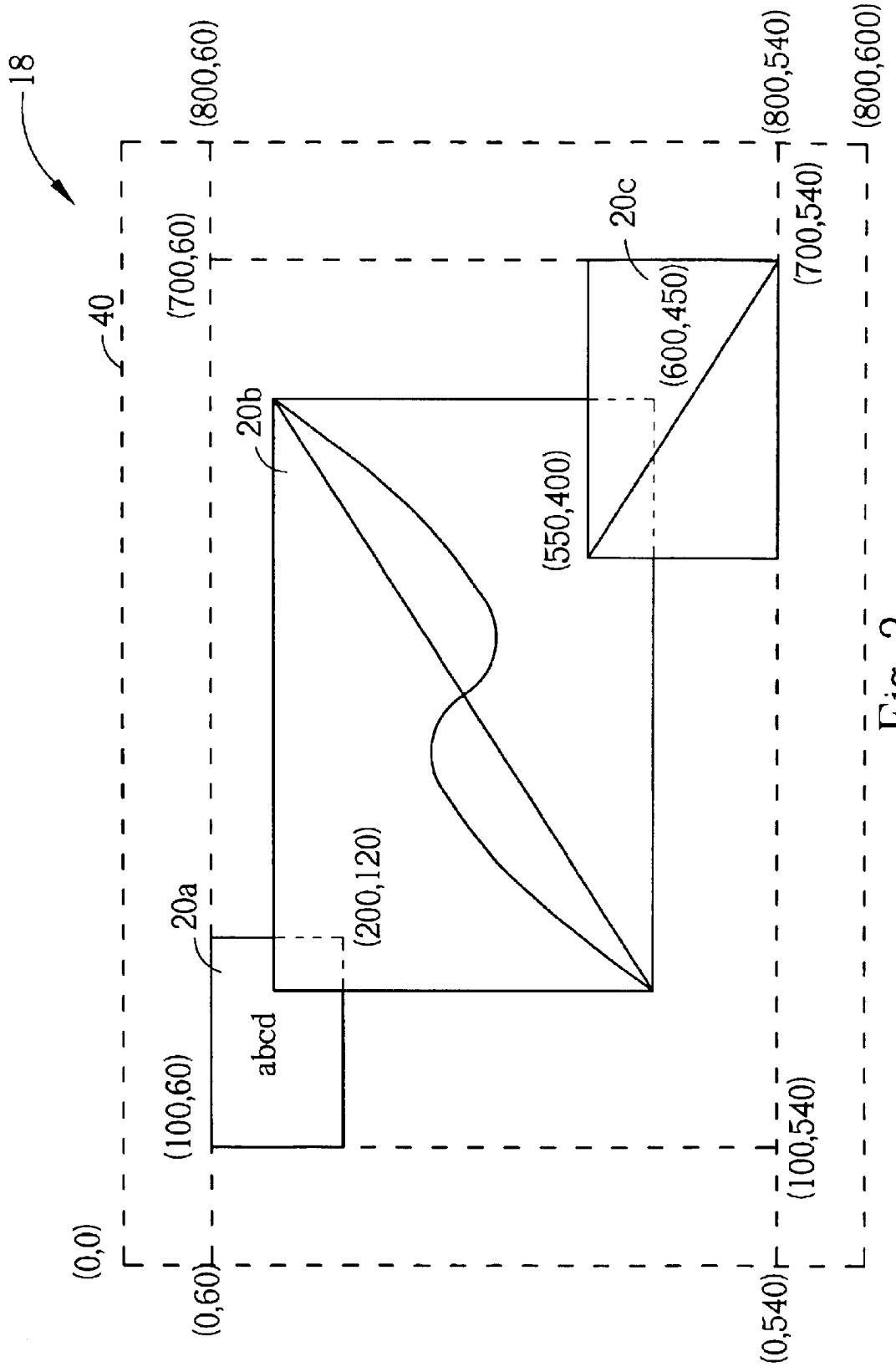
FIG. 2 is a schematic diagram of the document of FIG. 1.

Please refer to FIG. 1 and FIG. 2. FIG. 2 is a schematic diagram of the document 18. Generally, each document of the computer system 10, which is sent to the printer 30 to be printed, has at least one object. In the first embodiment, the document 18 has three objects 20a, 20b, and 20c. Each of the objects 20a–20c has a plurality of pixels 22 and related coordinates 24. When the computer system 10 generates the print data of the document 18 to the printer 30, the GDI 14 provides corresponding information of the document 18, such as the pixels 22 and the coordinates 24, to the computer system 10 so that the computer system 10 can convert the document 18 into the full-page image and then generate corresponding print data to the printer 30.

The document 18 has a print region from (0,0) to (800, 600). However, the three objects 20a–20c of the document 18 are just located within the region from (100,60) to (700,540), so no objects exist within the following four regions: (0,0)–(800,60), (0,60)–(100,540), (700,60)–(800, 540), and (0,540)–(800,600). Therefore, generation of the print data corresponded to the four regions should be simplified. In the first embodiment, the GDI 14 provides the coordinates of the objects 20a–20c in the document 18 so that the print driver 16 can define the region (100,60)–(700, 540) as a major processing area and the other four regions containing no objects as non-object areas according to the coordinates 24 of the objects 20a–20c provided by the GDI 14. When the GDI 14 and the printer driver 16 define the region (100,60)–(700,540) as the major processing area, the memory 26 is used to record the coordinates 24 of the objects 20a–20c in the document 18 so as to define the major processing area. For example, the memory 26 may record the region (100,60)–(200,120) as the major processing area when the GDI 14 provides the coordinate 24 of the object 20a, and then when the coordinates 24 of the objects 20b and 20c are respectively provided, the major processing region recoded in the memory 26 is later changed to (100,60)–(600,450) and to (100,60)–(700,540) in turn.

Figure 3:
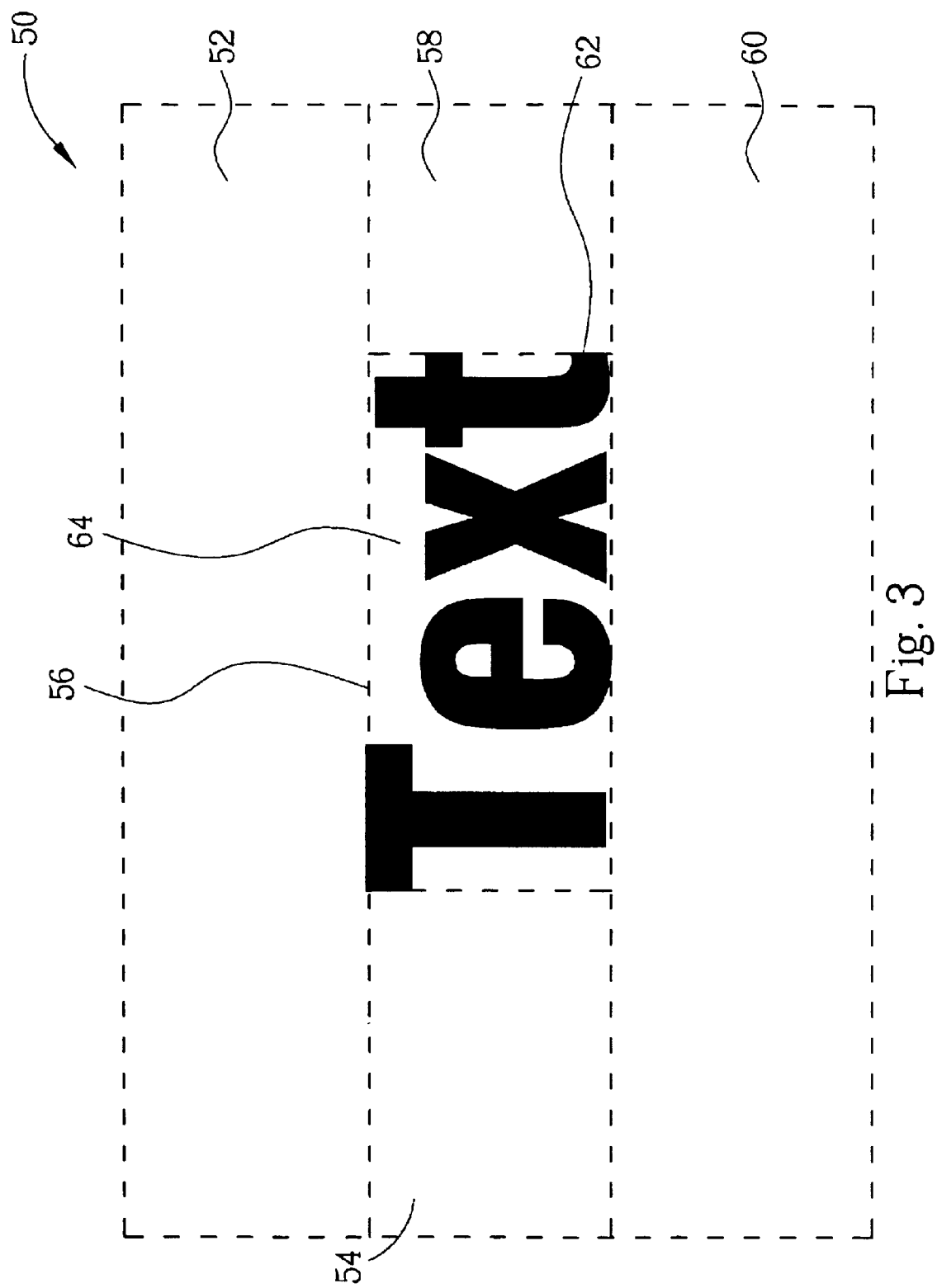
FIG. 3 is a schematic diagram of another document.

Please refer to FIG. 3, which is a schematic diagram of another document 50. The document 50 only comprises a text object, i.e. shown as "Text". Therefore, the document 50 is separated into a major processing area 56 and four non-object areas 52, 54, 58, and 60. The major processing area 56 is further separated into an object area 62 and an empty area 64. The object area 62 is the region for displaying the text object of the document 50, and the empty area 64 contains all parts of the major processing area 56 except the object area 62. When the print data of the document 50 is generated, the print data corresponded to the four non-object areas 52, 54, 58, and 60 is generated by filling in a memory, which is used to store the print data, with null values. The print data corresponded to the major processing area 56 is generated by filling in the memory with null values and then calculating the print data of the major processing area 56 according to the null values of the empty area 64 and the pixels of the object area 62 provided by the GDI 14. Because of the filling of the null values and the independent procedure of the print data of the major processing area 56, the speed of the print data generation may be increased.

Figure 4:
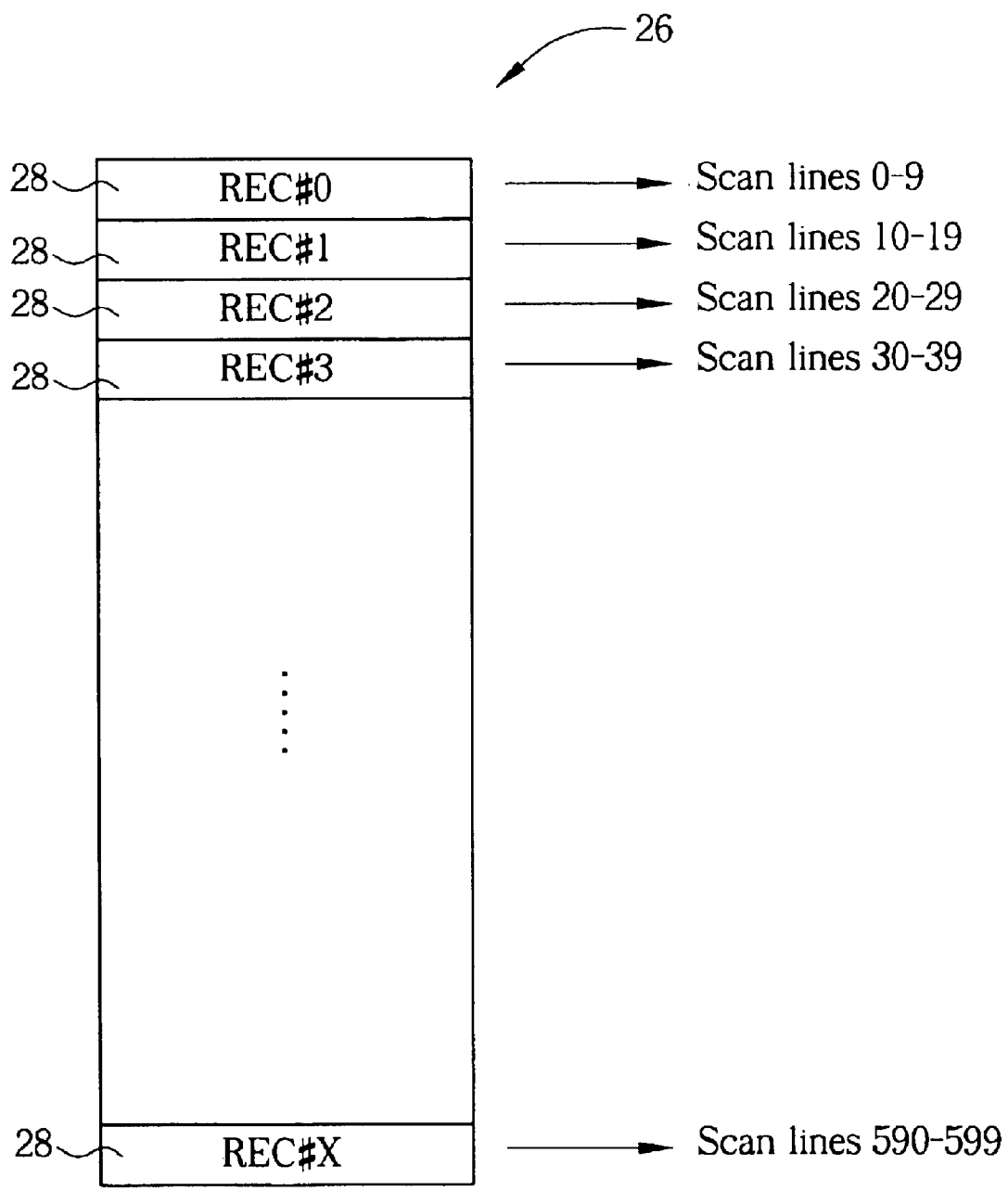
FIG. 4 is a record table of the memory in FIG. 1 according to a second embodiment of the present invention.
Figure 5:
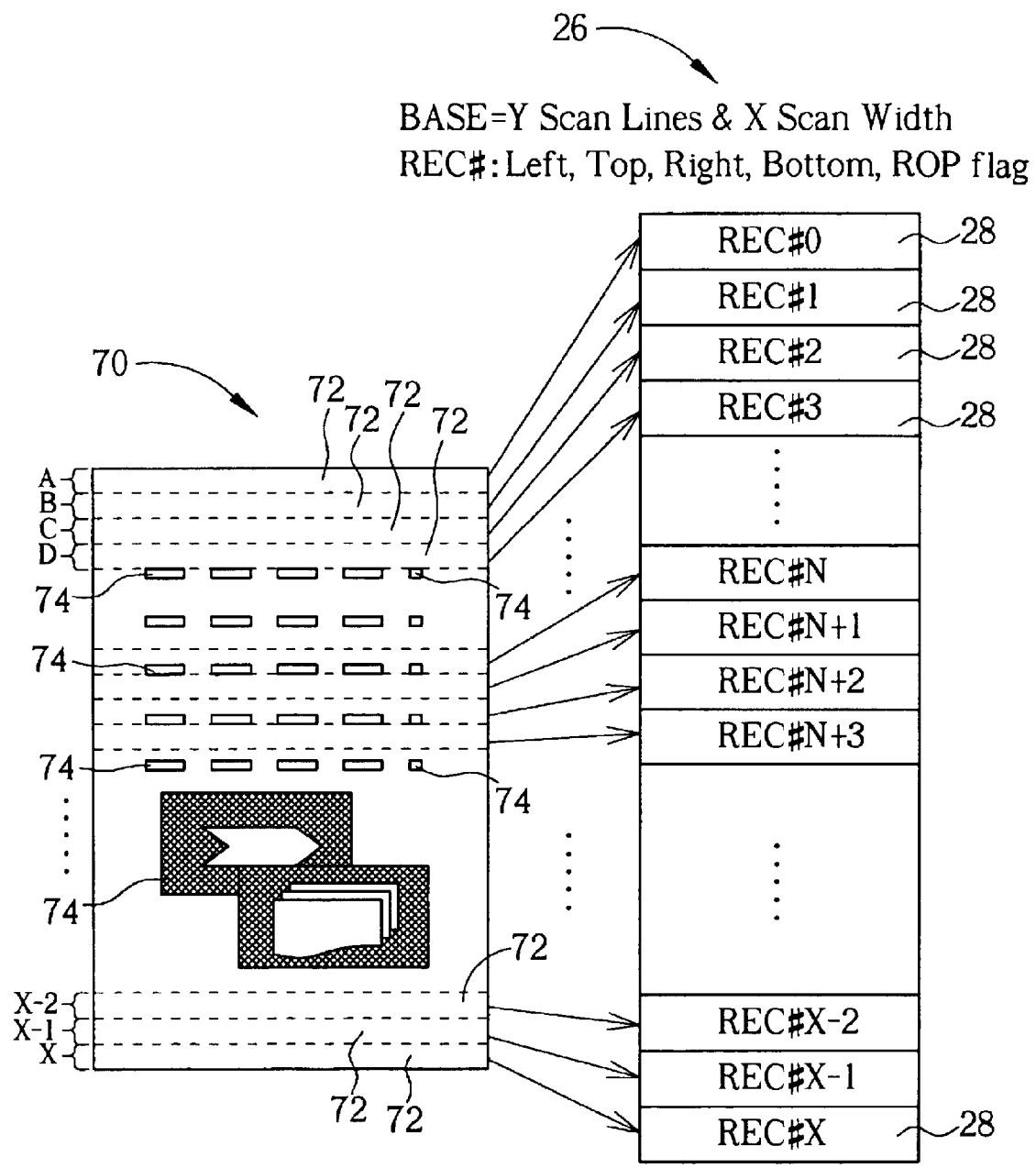
FIG. 5 is a relationship diagram showing a plurality of blocks of a document mapped to the memory shown in FIG. 1.

Please refer to FIG. 4 and FIG. 5. FIG. 4 is a record table of the memory 26 according to a second embodiment of the present invention. FIG. 5 is a relationship diagram showing a plurality of blocks 72 of a document 70 mapped to the memory 26. In the second embodiment, the document 70 also comprises some objects 74 and has dimensions of 8.5 inches by 11 inches. The resolution of the document 70 is 600 DPI. The memory 26 is used to establish an address array and has a plurality of address units 28. The document 70 is divided into a plurality of blocks 72. The blocks 72 are of equal size and each contains 10 scan lines of the document 70, but the present invention should not be construed as limited by this. Each of the address units 28 corresponds to one of the blocks 72 for recording positions of the objects 74 in the block 72. For example, the first address unit REC#0 records the positions of the objects 74 in the first ten scan lines of the document 70, i.e. the scan lines 0–9, and the second address unit REC#1 records the positions of the objects 74 in the next ten scan lines of the document 70, i.e. the scan lines 10–19. When the computer system 10 generates the print data of the document 70 to the printer 30, the GDI 14 provides the objects 74 of the document 70 and the coordinates of the objects 74 in the document 70 to the printer driver 16, and then the positions recorded in the address units 28 are updated according to the coordinates of the objects 74 provided by the GDI 14. When updating the positions recorded in any address unit 28, if the corresponding block 72 of the address unit 28 does not contain any part of the objects 74 of the document 70, a predetermined flag (i.e. a "block empty" flag) is written into the address unit, however, if the block 72 contains any part of the objects 74 of the document 70, an image piece 82 is generated by performing a conversion process on the block 72. For example, the first three blocks A–C do not contain any object 74, so the three address units REC#0–REC#2 record the same flag, such as a null value, and the three corresponding images pieces #A–#C are generated by filling in a predetermined code (i.e. an "empty code"). On the other hand, the block N contains some objects 74, so the corresponding address unit REC#N records an upper left coordinate and a lower right coordinate of the block N in the document 70, and the image piece #N is generated by performing a conversion process on the block N according to the pixels of the objects 74 in the block N provided by the GDI 14. When the conversion process of the block N is being performed, if the printer 30 is in a monochrome print mode, the objects 74 in the block N are converted into gray-level image data, and then the gray-level image data is converted into the image piece #N. However, if the printer 30 is in a color mode when performing the conversion process of the block N, the objects in the block N are converted into cyan-magenta-yellow-black (CMYK) image data, and then the CMYK image data is converted into the image piece #N. The printer 30, thus, can print either white-black documents or color documents.

Figure 6:
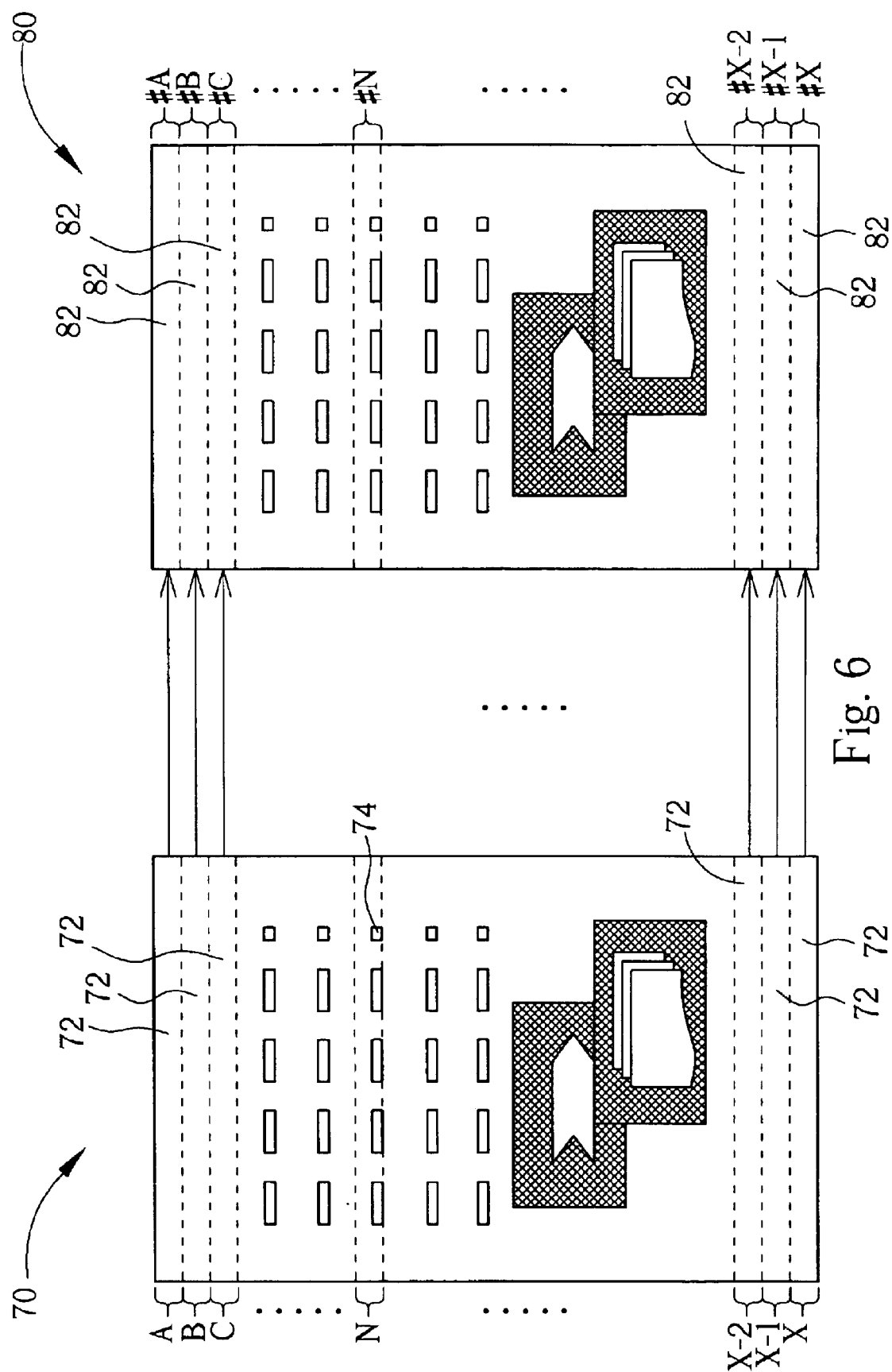
FIG. 6 is a schematic diagram of the document shown in FIG. 5 and a full-page image.

The GDI 14 and the printer driver 16 will generate a full-page data according to the coordinates recorded in the address units 28. Please refer to FIG. 6, which is a schematic diagram of the document 70 and the full-page data 80. The full-page data 80 has a plurality of data pieces 82, and each of the data pieces 82 corresponds to one of the blocks 72 of the document 70. When the print data of the document 70 is generated, the GDI 14 and the printer driver 16 generate a corresponding data piece 82 for each block 72 according to the updated positions recorded in the corresponding address unit 28. For example, the data piece #A is generated according to the updated positions recorded in the address unit REC#0. The GDI 14 and the printer driver 16 only generate one of the data pieces 82 at one time so that the capacity of the memory 26 for temporarily storing processed raster data, i.e. pixels and print data, can be reduced. For example, if the document 70 is divided into M blocks, the capacity of the memory 26 for temporarily storing processed raster image data could be reduced to about 1/M of the data amount of the full-page data 80. In the second embodiment, the full-page data 80 is the print data of the document 70 and can be transmitted to the printer 30 to be printed. After all of the data pieces 82 of the full-page data 80 are generated, the data pieces 82 are rendered as raster image CMYK data to merge into the full-page printing data 80, and then the full-page printing data 80 is transmitted to the printer 30. When the printer 30 receives the full-page printing data 80, the printer 30 prints the full-page data 80 automatically.

Figure 7:
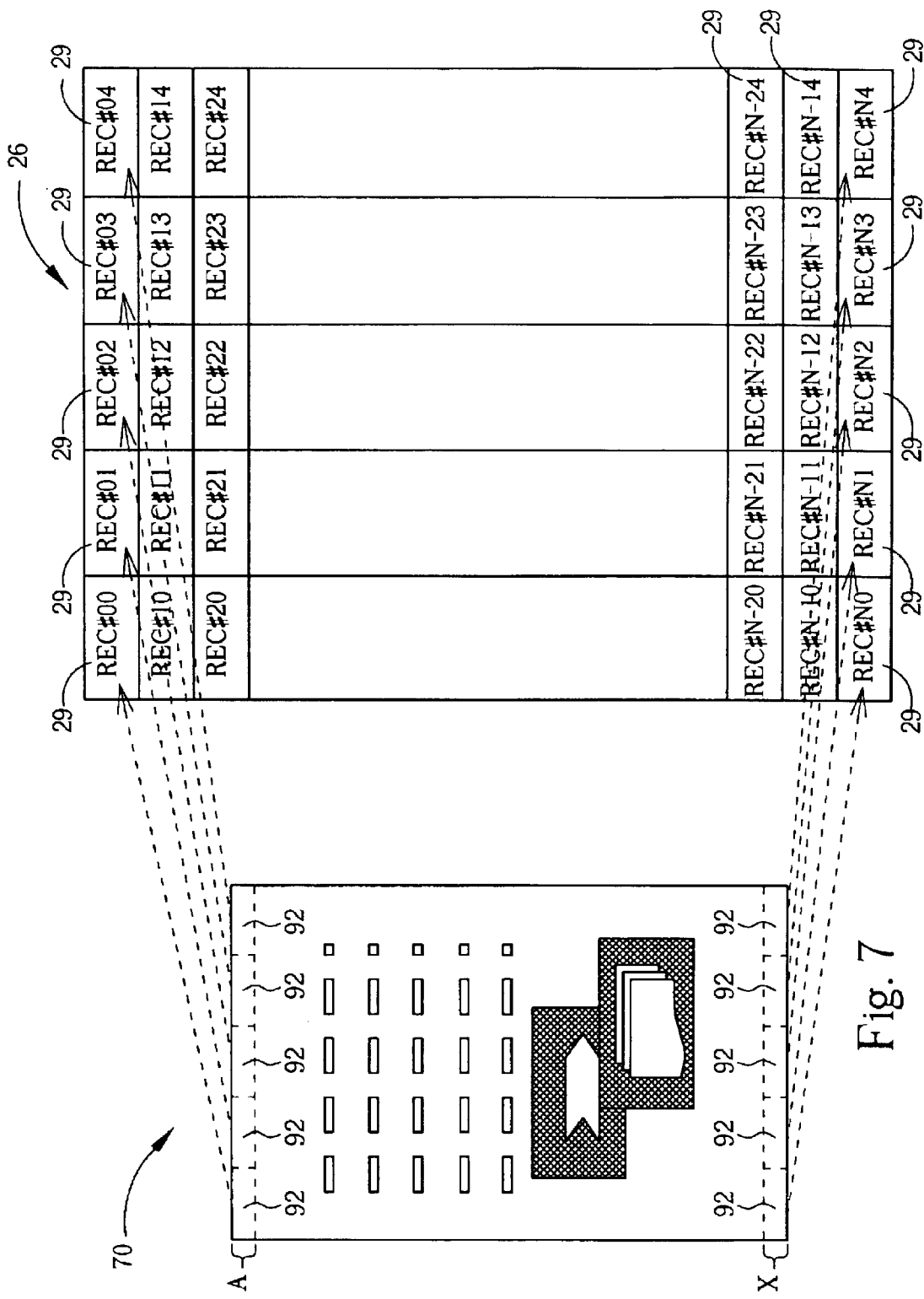
FIG. 7 is a relationship diagram showing the document in FIG. 5 mapped to the memory in FIG. 1 according to a third embodiment of the present invention.

Please refer to FIG. 7., which is a relationship diagram showing the document 70 in FIG. 5 mapped to the memory 26 in FIG. 1 according to a third embodiment of the present invention. The major difference between the third embodiment and the second embodiment is that in the third embodiment each ten scan lines of the document 70 is further divided into five blocks 92, and an amount of address units 29 is five times of the amount of the address units 28. Similar to the second embodiment, the GDI 14 and the printer driver 16 only generate one of the corresponding image pieces at one time, and then merge all of the image pieces into the full-page image 80.

In contrast to the prior art, the present invention discloses a method for generating a full-page image by merging a plurality of image pieces, where each of the image pieces is generated without referencing other objects located within other blocks of the document. Therefore, generation of print data according to the present invention is more efficient. Moreover, at a given time, only one of the image pieces is generated so that the capacity of the memory for temporarily storing data can be reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for converting a document into a full-page printing data using a graphical device interface (GDI) of an operating system, the operating system being installed on a computer system for controlling operations of the computer system, and the GDI capable of managing graphical processes of the computer system, the method comprising:

providing objects of the document and coordinates of the objects in the document using the GDI;

dividing the document into a plurality of blocks;

establishing an address array having a plurality of address units, wherein each of the address units corresponds to one of the blocks for recording positions of the objects in the block;

updating the positions recorded in the address units according to the coordinates of the objects provided by the GDI;

generating a corresponding data piece for each block according to the updated positions recorded in the corresponding address unit until informed of page end by the GDI;

rendering the data piece into raster image data pieces based on the recorded data position; and merging the raster image data pieces into the full-page printing data.

2. The method of claim 1 wherein when updating the positions recorded in any of the address units, if the corresponding block of the address unit contains any part of the objects of the document, an upper left coordinate and a lower right coordinate of the parts of the objects in the block are written into the address unit.

3. The method of claim 1 wherein when updating the positions recorded in any address unit, if the corresponding block of the address unit does not contain any part of the objects of the document, a predetermined flag is written into the address unit.

4. The method of claim 1 wherein when generating any data piece of the blocks, if the block contains any part of the objects of the document, the data piece is generated by performing a conversion process on the block.

5. The method of claim 4 wherein when performing the conversion process, an object in the block is converted into gray-level data, and the gray-level data is converted into a monochrome data piece.

6. The method of claim 4 wherein when performing the conversion process, an object in the block is converted into cyan-magenta-yellow-black (CMYK) raster image data, and the CMYK image data is converted into the printing image data.

7. The method of claim 1 wherein when generating any printing image data of the blocks, if the block does not contain any part of the objects of the document, a plurality of pixels having a predetermined code are merged into the printing image data.

8. The method of claim 1 wherein the blocks are of equal size.

* * * * *